United States Patent [19]

Clyne

[11] 4,341,072

[45] Jul. 27, 1982

[54] METHOD AND APPARATUS FOR CONVERTING SMALL TEMPERATURE DIFFERENTIALS INTO USABLE ENERGY

[76] Inventor: Arthur J. Clyne, 5651 N. Luce Rd., Alma, Mich. 48801

[21] Appl. No.: 119,287

[22] Filed: Feb. 7, 1980

[51] Int. Cl.³ ............................................. F03G 7/06
[52] U.S. Cl. ........................................ 60/325; 60/527; 60/413
[58] Field of Search ............... 60/527, 325, 530, 531, 60/413

[56] References Cited

U.S. PATENT DOCUMENTS

| | | | |
|---|---|---|---|
| 2,115,501 | 4/1938 | Vernet | 297/3 |
| 2,215,157 | 9/1940 | Platzner | 60/527 |
| 2,884,866 | 5/1959 | Patterson | 103/152 |
| 3,291,054 | 12/1966 | McKenzie | 60/527 X |
| 3,376,631 | 4/1968 | Sherwood et al. | 29/405 |
| 3,404,530 | 10/1968 | Churchill et al. | 60/527 |
| 3,611,713 | 10/1971 | Janovs | 60/527 |
| 3,696,611 | 10/1972 | Noakes et al. | 60/527 |
| 3,823,560 | 7/1974 | Hansen | 60/527 |
| 3,991,574 | 11/1976 | Frazier | 60/325 X |
| 4,041,705 | 8/1979 | Siegel | 60/497 |
| 4,075,845 | 2/1978 | Allen | 60/527 |
| 4,135,366 | 1/1979 | Siegel | 60/497 |
| 4,235,075 | 11/1980 | Erb | 60/527 |

FOREIGN PATENT DOCUMENTS

474510  2/1915  France ................................. 60/531

Primary Examiner—Allen M. Ostrager
Assistant Examiner—Stephen F. Husar

[57] ABSTRACT

A method and apparatus for converting temperature differentials to usable energy employs a crystalline fusible material (47) having a fusion temperature in the range of from 70° to 120°. The fusible material (47) is mounted inside a cylinder housing (26) for driving a piston (22) therein as the fusible material (47) is alternately frozen and thawed by warm and cool fluid which is alternately circulated around and through the cylinder housing (26). The cool fluid is obtained from an unrefrigerated, ambient cool water source, such as tap water, ground water, evaporative cooler, or the like. Warm fluid is obtained from waste heat, solar heat, etc. In this system, a fine control is provided to insure that the crystalline fusible material (47) does not totally freeze or thaw, but rather remains in a transient state at all times. The piston (22) is linked to a hydraulic accumulator (12) for creating and maintaining hydraulic pressure. Hydraulic fluid (74) from the hydraulic accumulator (12) is used to drive a power take-off device (14). A regeneration system reclaims waste heat from the hydraulic accumulator (12) and the power take-off device (14) for reuse by a warm water source (18).

25 Claims, 13 Drawing Figures

METHOD AND APPARATUS FOR CONVERTING SMALL TEMPERATURE DIFFERENTIALS INTO USABLE ENERGY

BACKGROUND OF THE INVENTION

This invention relates broadly to the art of heat-actuated power plants, and more specifically to apparatus and a method for generating and utilizing energy from a piston which is moved by expansion and contraction of a motivating medium upon thawing and freezing thereof.

A number of United States patents disclose power plants which operate by the expansion and contraction of materials when they are thawed and frozen. Among these are U.S. Pat. Nos. 2,115,501 to Vernet; 2,215,157 to Platzner; 2,884,866 to Patterson; 3,376,631 to Sherwood et al; 3,404,530 to Churchill et al; 3,611,713 to Janous; 3,696,611 to Noakes et al; 3,823,560 to Hansen; and 4,075,845 to Allen.

A difficulty with most of the devices described in the above-listed patents is that they are often unduly large and are relatively slow in operation. Because of the slowness of operation it is difficult to convert large amounts of heat energy to kinetic energy with most of those devices for driving machinery such as airconditioners, and the like. It is therefore an object of this invention to provide a freeze/thaw engine of relatively small size, and a method of operating the same, which converts sufficient amounts of heat energy into mechanical energy to drive many mechanical devices such as air conditioners, irrigation systems, generators and the like.

Yet another difficulty with many of the devices described in the above mentioned patents is that they depend for efficient operation entirely upon ambient air temperatures, which are not always predictable. That is, the fusion materials used therein are frozen by ambient air temperature. It is, therefore, yet another object of this invention to provide a freeze/thaw engine which does not unduly depend upon, ambient air temperature for proper operation.

There appears to be a need for an engine which can be driven by heat at a relatively low temperature in order that machinery can be driven from such sources as waste heat, solar cells, and the like. That is, there exists heat engines which can be driven by fluids at high temperatures, such as by steam, but there does not appear to be a commercially practical, and dependable, engine which can be driven by heat in the temperature range of from 70° to 120°. It is an object of this invention to provide such a engine and method of driving the engine.

It is a further object of this invention to provide an effective system for utilizing energy from the temperature differential between ambient water and a warm water source.

It is a further object of this invention to provide such a system which can be driven with warm and cold tap water.

There also appears to be a need for a engine which can be efficiently driven both from intermittent, low temperature-type sources, such as waste, heat and solar cells, and from steadier high temperature sources such as combustion devices, and heat pumps and the like. It is an object of this invention to provide such an engine.

It is a further object of this invention to provide an engine and system to perform work which does not require the use of fossil or other combustible fuel, but rather uses instead, less expensive energy such as sunlight, waste heat from other sources, and geothermal energy.

SUMMARY OF THE INVENTION

According to principles of this invention, a piston in a cylinder is driven by the expansion and contraction of a substance when ambient cool and warm water is alternately circulated in close proximity with the cylinder to warm and cool the substance. The ambient cool water is normally obtained from water which has passed through the earth or other natural coolant. The piston pressurizes a hydraulic fluid which is mounted in the cylinder and this hydraulic pressure is stored in accumulators. The accumulators are cylinders with pistons having the pressurized hydraulic fluid positioned on one side thereof, and an energy storage means mounted on the other side thereof, such as nitrogen or air. As hydraulic fluid is forced into the cylinder, the nitrogen is compressed to maintain the pressure of the hydraulic fluid. The thusly pressurized hydraulic fluid is used to drive an energy utilization device, such as a hydraulic motor. A heat transfer fluid is circulated through jackets and heat exchangers passing about the accumulators and energy utilization means for recapturing heat thereby generated to be used to help warm the water at the warm water source. The warm water source, in one embodiment, is a solar collector.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

System

Figure 1:
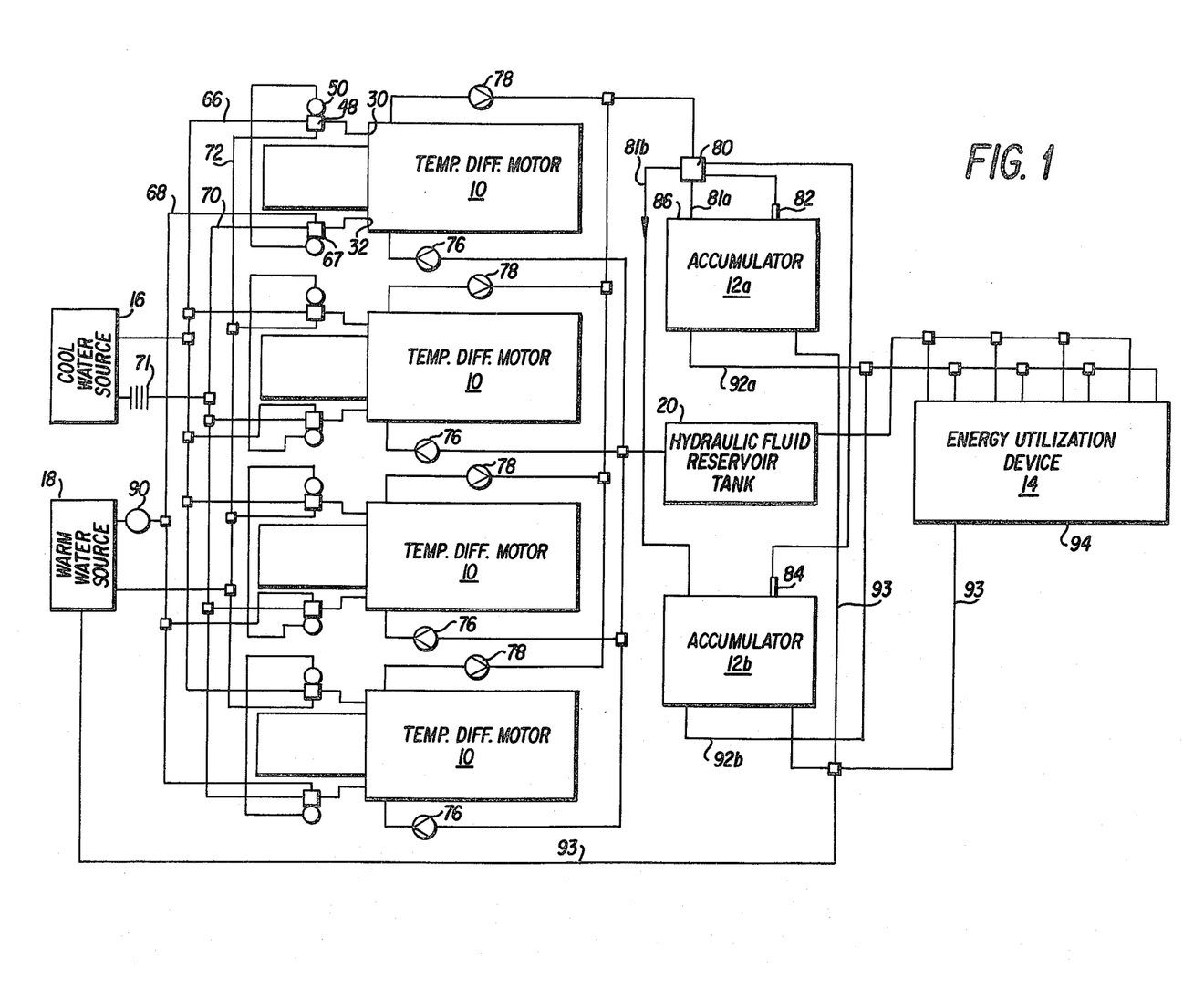
FIG. 1 is a schematic of the motive system employed in this invention.

The overall motive system of this invention employs water-temperature differential Clyne motors or engines, 10, hydraulic-pressure accumulators 12a and b, an energy utilization device 14, cool and warm water sources 16 and 18, and a reservoir tank 20. Basically, in operation, the cool and warm water sources 16 and 18 alternately supply cool and warm water to the temperature-differential Clyne engines 10 to drive pistons 22 (FIG. 2) therein. The pistons, when thusly reciprocated, pump hydraulic fluid into the accumulators 12a and b where the hydraulic fluid is stored at an extremely high pressure. The thusly pressurized hydraulic fluid is used to drive the energy utilization device 14 which, in turn, drives a compressor, electrical generator, or the like.

Temperature Differential Engine

Describing the water-temperature differential Clyne engines 10 in more detail (only one engine is described, with reference to FIG. 2, since all the Clyne engines are identical), it has a cylinder housing 26 in which the piston 22 is free to reciprocate. The piston 22 makes sliding contact with a side wall 27 of the cylinder housing 26 to form a seal therebetween past which fluid cannot ordinarily flow. The cylinder housing 26 has a jacket cavity 28 about its circumference through which fluid from the cool and warm water sources 16 and 18 (FIG. 1) can be alternately circulated via inlet and outlet ports 30 and 32. In addition, tubes 34 extend across the cylinder housing, into a main cylinder cavity 35 between portions of the jacket cavity 28. Fluid entering the jacket cavity 28 at the inlet port 30 not only passes through the jacket cavity 28 but also through the tubes 34, due to baffles (not shown) which prevent direct communication between the inlet and outlet ports 30 and 32. In an undepicted embodiment there are two tubes side-by-side at various cross-sectional planes rather than a single serpentine pipe 34 to provide greater fluid flow across the main cylinder cavity 35.

Figure 2:
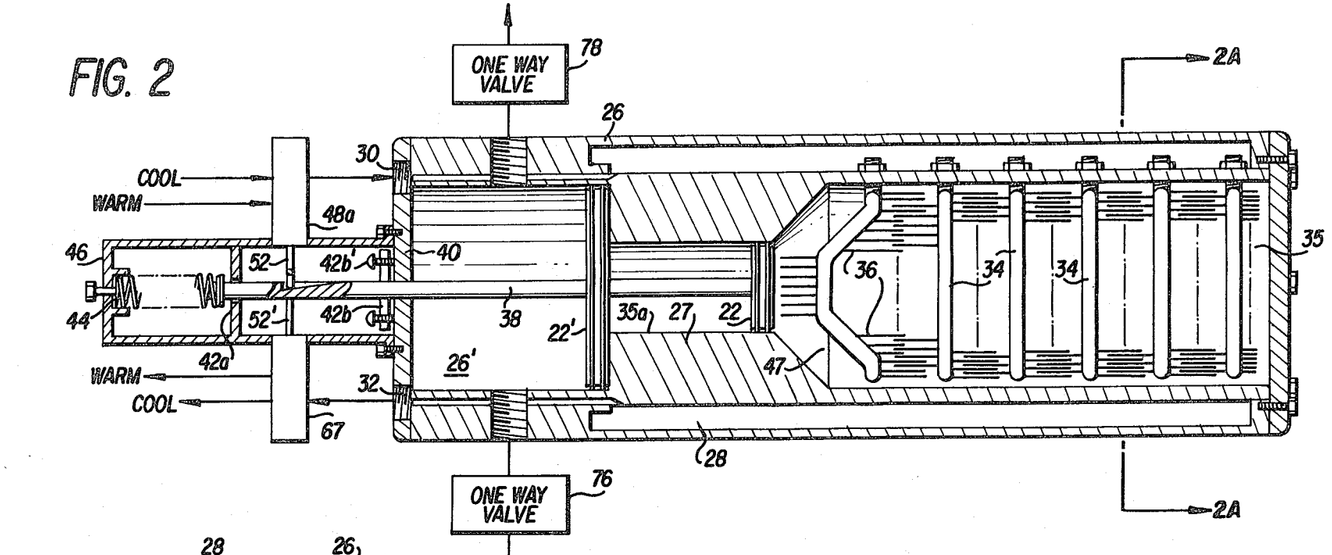
FIG. 2 is a cut-away view of a freeze/thaw piston/cylinder device employed in the system of FIG. 1, with a valve control mechanism therefor being depicted schematically.
Figure 2A:
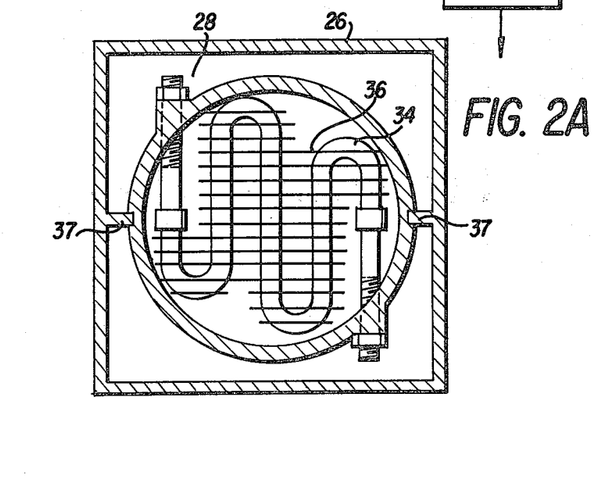
FIG. 2A is a cross-section taken on line 2A—2A of FIG. 2.

It can be seen in FIG. 2 that tubes 34 are positioned in about half of the entire main cylinder cavity 35 and that the piston 22 cannot travel in this portion of the main cylinder cavity 35. The piston 22, on the other hand, can reciprocate in a restricted (as seen in FIG. 1) portion 35a of the main cylinder cavity 35 where the tubes 34 are not located. In this respect, each of the tubes 34 has radiating therefrom fins 36 to enhance the heat dissipation capabilities of the tubes 34.

A connecting rod 38 is attached at the center of the piston 22 and extends outwardly through a rear end 40 of the cylinder housing 26. Plates 42a and b are mounted on the connecting rod 38 external of the cylinder housing 26. A compression spring 44 impinges on the plate 42a and onto a connecting-rod cover 46 at the other end thereof while the plate 42b forms a connecting rod stop against the cylinder rear end 40. Thus, the compression spring 44 urges the piston 22, as seen in FIG. 2, to be moved to the right until adjustable pins 42b' on the plate 42b strike the cylinder rear end 40. In an unillustrated embodiment, the compression spring 44 is not needed, as will be explained below.

A fusion material 47 is located to the right of the piston 22 inside the cylinder housing 26. This fusion material has the characteristics of expanding and contracting when it is respectively thawed and frozen. Further, the fusion material should freeze at a temperature at least 10° F. above ambient underground water temperature, but the fusion temperature should not be so high that it will take an inordinately high temperature to melt it. Underground water temperatures often fall within the range of from 50° to 65° F. It is relatively easy to create water temperatures up to 120° F. by use of solar energy, waste heat sources and the like. That is, machinery is often designed to produce waste water in this range which is not dangerous to human touch. Thus, the fusion temperature of the fusion material 47 should be within the range of from 70° to 120° F., preferably falling below 100° F. In the preferred embodiment, the fusible material is in a crystalline form rather than being an amorphous substance. The preferred fusion material is calciumchloride hexahydrate which will fuse at 81° F. The expansion factor of this material is 10%. An interesting aspect of such crystalline fusion materials is that if they are totally frozen, they may not thaw unless they are superheated (heated beyond the fusion temperature) and if they are thawed, they may not freeze unless they are supercooled (cooled beyond the fusion temperature). Further, if they are thawed they may not freeze even if they are supercooled. Thus, an aspect of this invention is to insure that the fusion material always operates in the transient zone so that there is always some "seed" crystalline structure present in the substance. In this way the substance will more readily freeze in response to application of cool water.

The application of cool and warm water from the cool and warm water sources 16 and 18 is controlled by an inlet valve assembly 48a. The inlet valve assembly 48a includes a valve-control device 50 (FIG. 4) which is located on the connecting rod cover 46. In one embodiment, this valve-control device comprises a cam 52 which extends from a fluid-tight cylinder housing 54. The housing 54 screws into the connecting rod cover 46 so that the cam 52 rests on the connecting rod 38. A synchronization groove 58 is cut into the connecting rod 38 at a gradually varying depth as a function of its longitudinal position along the connecting rod 38. The cam 2 rides within the groove. As the piston 22 moves along the cylinder housing 26 the position of the cam 52 is changed by the increasing or decreasing depth of the groove 58 proportionately to the movement of the piston 22.

Figure 4:
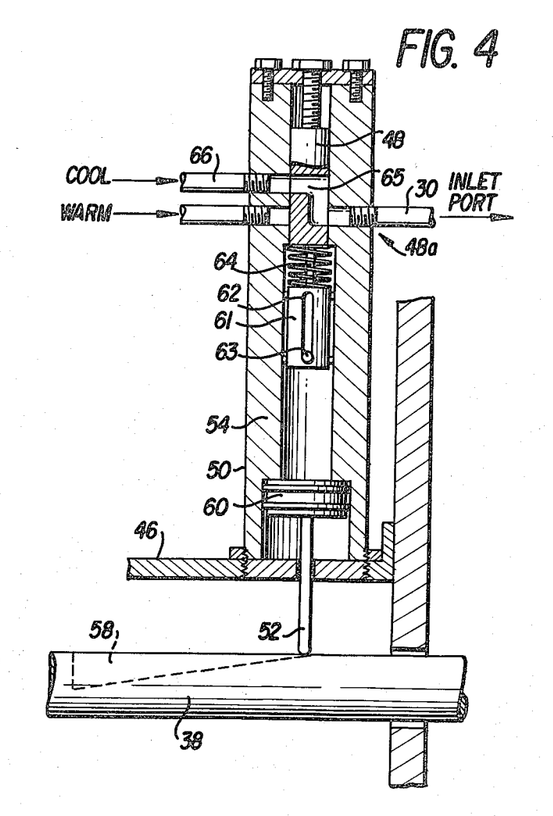
FIG. 4 is a partially sectional view of a portion of the system of FIG. 1 depicting a direct valve control mechanism for operating valves of the FIG. 1 system.

The cam 52 is connected to a piston 60 which freely moves up and down within the fluid-tight cylinder housing 54 following the up and down motion of the cam 52. Hydraulic fluid is contained within the cylinder housing 54 above the piston 60. As the cam 52 and piston 60 move up into the cylinder housing 54 pressure is built up above the piston 60, causing a second piston 61 to move upwardly. The second piston 61 has a slot 62 therein in which a follower 63, of a valve actuator rod 64 rides. When the second piston 61 has moved upwardly until the end of its slot 62 contacts the follower 63, the valve 48 is moved upwardly, thereby bringing a valve aperture 65 into registration with a cool water tube 66. Thus, cool water is fed to the inlet port 30. This procedure is reversed to feed warm water to the inlet port 30. Thus, when the rod 38 reaches the end of its stroke at each end, the type of water being fed to the temperature-differential Clyne engine 10 is switched.

Figure 5:
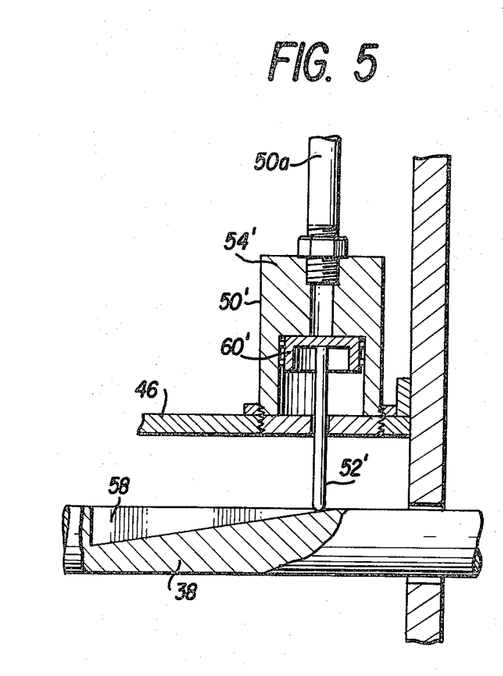
FIGS. 5 and 6 are sectional views of a remote valve control mechanism for operating the valves of the FIG. 1 system.
Figure 6:
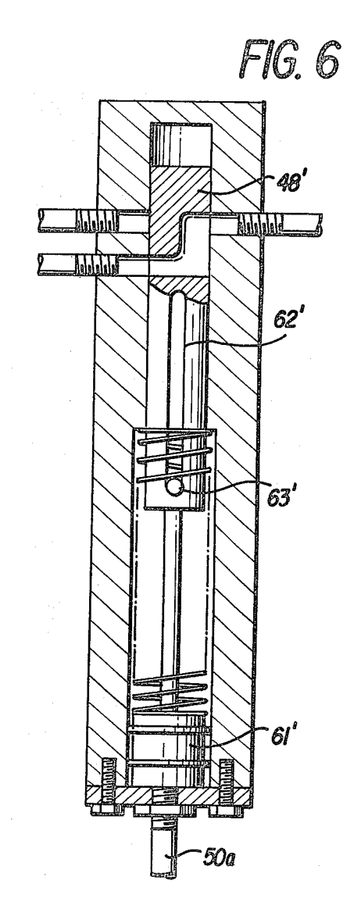

FIGS. 5 and 6 depict a different embodiment of the valve actuator of FIG. 4 in which a valve 48' is remote from a valve actuator 50'. This embodiment is quite similar to the FIG. 4 embodiment (similar reference numerals referring to similar elements), however, it differs in that it requires a tube 50a to communicate fluid pressure from a cam piston 60' to a second piston 61' and in that a follower 63' is attached to the second piston 61' and a slot 62' is on the valve 48', which is flip-floped from the arrangement of these elements in the FIG. 4 embodiment. It is noted that the assemblies depicted in FIGS. 5 and 6 are shown 180° out of phase in a cycle of operation.

Figure 7:
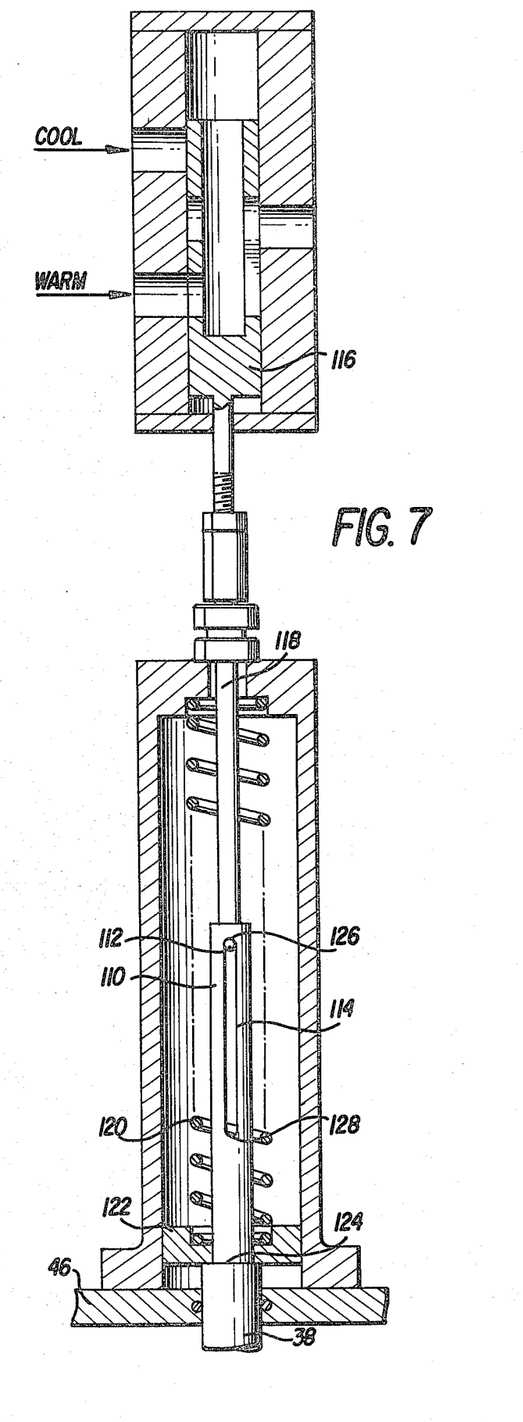
FIGS. 7 and 8 are partially sectional views depicting another-embodiment valve arrangement for use in the FIG. 1 system.
Figure 8:
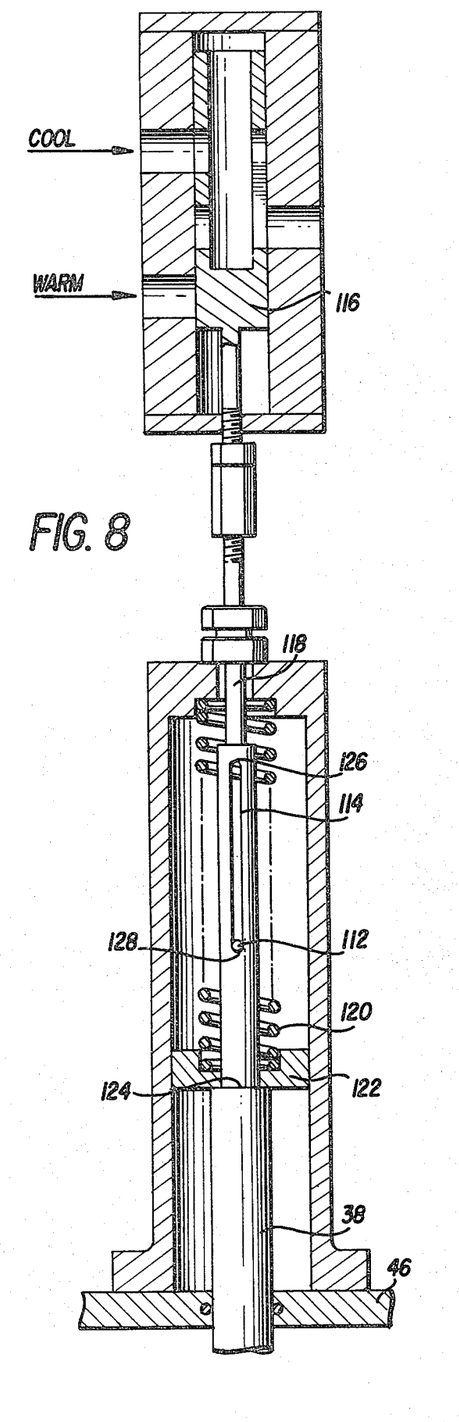
Figure 9:
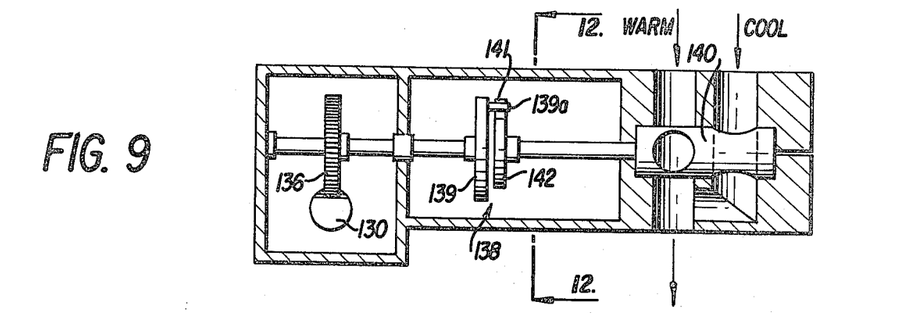
FIGS. 9–12 depict yet another-embodiment valve arrangement for use in the FIG. 1 system, with FIGS. 9–11 being side partially sectional views, and FIG. 12 being a sectional view taken on line 12—12 in FIG. 9.
Figure 10:
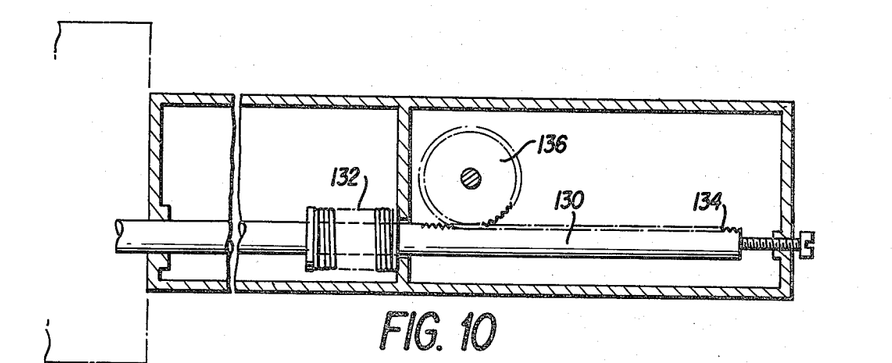
Figure 11:
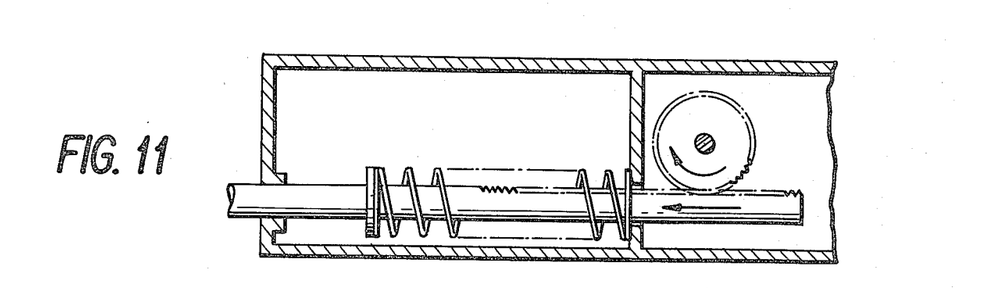
Figure 12:
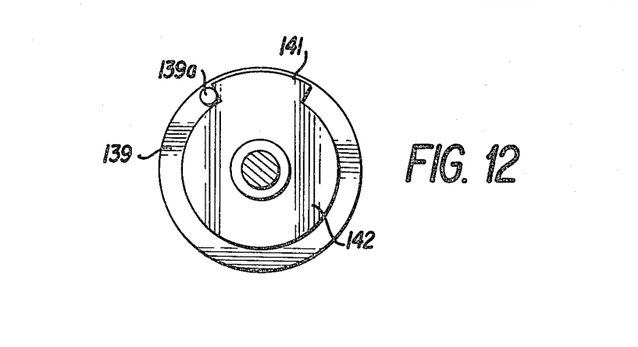

FIGS. 7 and 8 depict yet a third, and perhaps preferred, embodiment of the valve actuator. In this embodiment the connecting rod 38 extends through the end of the connecting rod cover 46 to move a slotted member 110 longitudinally with the rod 38. The slotted member 110 contacts a pin 112 at opposite ends of a slot 114 to move a valve member 116, the pin 112 being linked to the valve member 116 by a linkage member 118. A spring 120 biases a cap 122 of the slotted member 110 toward the outer end 124 of the connecting rod 38. In operation, when the fusion material 47 (FIG. 2) freezes, and therefore contracts, the connecting rod 38 moves inwardly (or upwardly as viewed in FIGS. 7 and 8 until an end 126 of the slot drives the pin 112 to move the valve member 116 and thereby allow flow of warm water to the jacket cavities 28 of the cylinder housing 26. The warm water thaws the fusion material 47. The arrangement of the valve member 116 in this mode is depicted in FIG. 7. Upon thawing, the fusion material expands until the end of the slot 128 drives the pin 112, and attached valve member 116, to allow passage of cool water, as is depicted in FIG. 8.

FIGS. 9-12 depict yet a fourth embodiment of the valve actuator. In this embodiment the rod 38 is linked, either directly or in a manner depicted in the FIGS. 4 and 5 arrangement, with an actuator shaft 130 to cause the actuator shaft 130 to move longitudinally with longitudinal movement of the rod 38. The actuator shaft 130 is biased against its driving linkage by a spring 132 and is toothed at 134 to drive a gear 136. The gear 136 actuates a lost motion mechanism 138, which, at extremities of movement of the rod 38, and of the actuator shaft 130 actuates a valve member 140. In this respect, the gear 136 is directly linked to a driving disc 139 having a pin 139a attached thereto. The pin 139a only contacts a lug 141 on a driven disc 142 after it, the pin, has traveled a certain angular distance. The rotary valve 140 is, in turn, driven by the driven disc 142 to alternately allow passage of cool and warm water. In operation, when the fusion material 47 is frozen, for example, the connecting rod 38 is caused to move inwardly, thereby moving the actuator shaft 130 downwardly, as viewed in FIGS. 10 and 11. This, in turn, rotates the gear 136 clockwise, which drives the pin 140 against lug 141 at the end of the stroke of rod 38. This rotates the valve member 140 to allow flow of warm water to the jacket cavities 28 of the cylinder housing 26.

The outlet port 32 (FIG. 1) of the jacket cavity 28 is coupled to an outlet valve assembly 67 which is also driven by a link 52' to the cam 52 (or as shown for the other valve actuator mechanisms of FIGS. 7-12) in a similar manner as the outlet valve assembly 48 to alternately apply water passing from the outlet port 32 to hoses 68 and 70. The hose 68 leads back to the warm water source 18 and the hose 70 exhausts to the ground, sewage, or recirculates the water through the ground or other cooler 71 and feeds it back into the cool water source 16.

With regard to the cool water source 16, this source can, for example, be normal tap water, well water, or water which is continually circulated through a large ambient heat sink, such as the earth or evaporative cooler. Preferably, this water should be ambient, or unrefrigerated, water. As used herein, ambient, or unrefrigerated, water is defined as water which is naturally cooled without the use of a refrigerant gas being compressed and expanded through a refrigeration cycle.

The warm water source 18 can, for example, be heated tap water, water which has been heated by solar energy, water which has been heated by waste heat from other machinery, and the like.

The water coming from the cool water source will normally be in the range of from 45° to 65° F. and will quite possibly be around 60° F., while the water passing from the warm water source will be in the range of 100° to 120° F. It is emphasized, however, that water from the warm water source can be as hot as is available, although it is also emphasized that very hot, over 120° F., water is not mandatory.

To drive the water-temperature differential Clyne engine 10, one need apply water from the warm water source 18 via a hose 72 (FIG. 1) and the valve 48 to the jacket cavity 28 (FIG. 2). This water will travel not only through the jacket cavity 28, but also through the tubes 34. The tubes 34, and their associated fins 36, and the cylinder housing 26 will warm the fusion material 47 to thereby thaw this material. When the fusion material 47 thaws, it expands, thereby urging the piston 22 to the left, as viewed in FIG. 2. Movement of the piston 22 moves the spring-load cam 52 (or other valve mechanism as is described above) to, in turn, operate the valve 48 and thereby disconnect the warm water source 18, and connect the cool water source 16 to the inlet port 30. Now cool water flows through the cylinder housing 26 and the tubes 34 to cool the fusion material 47 and thereby freeze it. This freezing causes contraction of the fusion material 47 which contraction, when coupled with spring 44, cause movement of the piston 22 to the right as viewed in FIG. 2. Piston movement to the right is continued until the valve-control device 50 (such as the spring loaded cam 52 or other valve actuating mechanism as is described above) again operates the valve assembly 48a to connect the warm water source 18 and disconnect the cool water source 16. In a similar manner, the outlet valve assembly 67 is also actuated via a link 52' (or other-embodiment valve actuator) to alternately expel cool water via the hose 70 and warm water via the hose 68. The warm water is recirculated to the warm water source 18, while the cool water is either exhausted to ground, or recirculated underground, for cooling, and back to the cool water source.

It will be appreciated by those skilled in the art that the amount of energy available to the Clyne engine 10 is the amount of heat taken out of the warm water, and the amount of heat that is added to the cool water. This can be computed by determining the exhaust temperatures of the respective warm and cool water and comparing these temperatures with the inlet temperatures of the warm and cool water.

Hydraulic Compression

A hydraulic fluid 74 is located in the clyinder housing 26 (FIG. 2) to the left of the piston 22, or an extension thereof 22'. As the piston 22 is reciprocated back and forth, an attached hydraulic-fluid extension 22' pumps hydraulic fluid 74 into a chamber 26' of the cylinder housing 26 from the hydraulic-fluid reservoir tank 20 via a one-way valve 76 and out through a one-way valve 78 into one of the accumulators 12a or b. In this respect, the hydraulic fluid traveling from the cylinder housing 26 passes through a channeling valve 80 which alternately directs the pressurized hydraulic fluid 74 through lines 81a and b to one of the accumulators 12a or b. The channeling valve 80 is driven by pressure-sensing devices 82 and 84 to choose the appropriate accumulator 12a or b, as will be described below.

Figure 3:
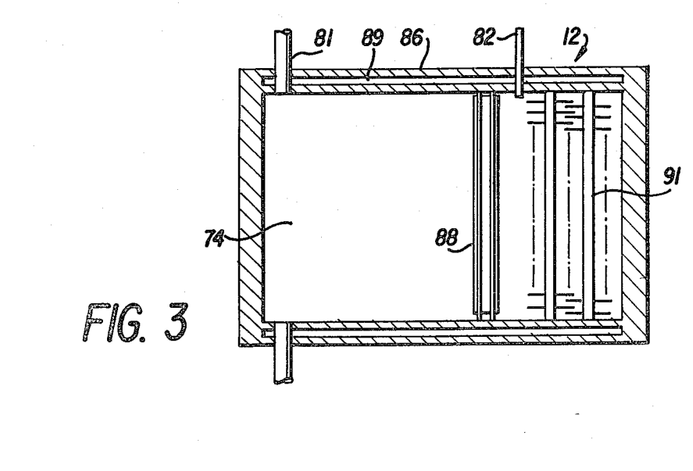
FIG. 3 is a side sectional view of an accumulator 12 employed in the system of FIG. 1.

The accumulators 12a and 12b (FIG. 3) are pressure cylinders 86 having working pistons 88 moving therein. Only one accumulator 12a will be described, since they are identical. Nitrogen, or other inert gas, is in the pressure cylinder 86 to the right of the piston 88 and hydraulic fluid 74 is in the cylinder to the left of the piston. The cylinder 86 has therein a jacket cavity 89 and heat exchanger 91 in the nitrogen compartment through which water can be circulated to pick up any heat generated by the working cylinder 86 and transported to the warm water source 18 for reuse thereby (recirculating tubes not shown in FIG. 3).

In operation, (with reference only to one accumulator 12) as pressurized fluid is pumped from the Clyne engine 10, through the line 81a into the pressure cylinder 86 of the accumulator 12a, the piston 88 is thereby driven to the right, and thereby compresses nitrogen that is to the right of the piston 88. This compressed air developes a back pressure which is exerted upon the hydraulic fluid 74 in the accumulator 12. As the nitrogen in the accumulator 12 is pressurized to between 8,000 and 10,000 psi, the pressure-sensitive device 82 (or 84 for accumulator 12b) realizes it, and switches the channeling valve 80 to furnish pressurized hydraulic fluid through the line 81b to the other accumulator 12b. If the second accumulator 12b should become fully charged, while the first accumulator 12a remains fully charged, the pressure-sensing devices switch a main cut-off valve 90 off (linkage between these elements is not shown) so that no further warm water can flow to the Clyne engine 10, thereby preventing a further buildup of pressure.

As the air in a compartment of the cylinder 86 is compressed, heat is generated and released. This heat is absorbed by the water circulating through the jacket cavity 89 (FIG. 3) and heat exchangers 91. The water heated thusly is returned to the warm water source 18. This linkage is indicated schematically in FIG. 1 by lines 93.

It will now be understood that pressurized hydraulic fluid is stored in the accumulators 12a and b.

Energy Utilization

The pressurized hydraulic fluid 74 is coupled via hoses 92a and b to an energy utilization device 14, such as a hydraulic engine, or the like, 94. The depicted hydraulic engine 94 includes intake and exhaust valves, piston chambers, pistons in the piston chambers, a drive train, and a synchronization device, none of which is depicted in detail. The hydraulic fluid 74, once it is used by the energy utilization device 94 and therefore no longer pressurized, is exhausted to the hydraulic-fluid reservoir tank 20.

The synchronization device is linked to the drive train via a timing chain to drive cams which open and close, alternately, the intake and exhaust valves in the same manner as an internal combustion engine. It will be understood that unlimited possibilities for energy-utilization devices are possible and that it is not necessary to describe the various possibilities in detail herein.

It can thereore be appreciated that hydraulic fluid 74 is in a closed circuit from the reservoir tank 20 to the engine cylinder housings 26, to the accumulators 12, to the piston chambers of the energy utilization device 14, back to the reservoir tank 20.

It will be understood by those skilled in the art that the hydraulic engine 94 is only exemplary of the type of energy utilization device which could be used with this invention. For example, another device could be constructed in which pistons directly act on a refrigerant, such as freon, to drive a refrigeration system.

The utilization device 14 is enclosed in a housing which again has a jacket through which water can be circulated to collect heat therefrom and provide it back to the warm water source 18 via the lines 93.

Returning to the temperature-differential Clyne engine 10, the spring 44 need only be used for starting up the motor because after the engine is started, pressurized hydraulic fluid 74 will act to help drive the piston 22 back to the right, as viewed in FIG. 1. When hydraulic fluid is used it can be selectively applied so that there is no counter force caused by a spring during the working stroke.

It will be appreciated by those skilled in the art that the heat engine and method of this invention provide practical means for converting low temperatures into useful kinetic energy. Further, this system does not depend upon ambient air temperatures but rather, upon water temperature, such as underground ambient water temperature, or evaporation cooled water temperature, which is much more predictable and obtainable. In addition, with this method and system an engine is provided which can be driven from normal hot and cold tap water or other available source of warm water.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A method of reciprocating a working member comprising the steps of positioning the working member inside a container for reciprocation therein; sealing the edges of said working member to the sides of said container to thereby form subchambers on opposite sides of said working member inside said chamber; positioning a fusible substance in one of said subchambers having the characteristic of expanding or contracting upon passing through its fusion temperature, the fusion temperature of said substance being at least 10° F. above an unrefrigerated water temperature; circulating a coolant which has been cooled by unrefrigerated water in close proximity to said container to thereby cool said fusible material; thereafter circulating warm coolant at least 10° warmer than said fusion temperature in close proximity to said cylinder to warm said fusion material wherein said fusion material is calcium-chloride hexahydrate.

2. A power generation system comprising:
an elongated side-wall member defining a working chamber;

a piston means mounted in said working chamber for moving longitudinally along said working chamber, but being in sealed relationship with the side-wall member;

a fusible substance inside said working chamber on one side of said piston means, said fusible substance having the characteristic of changing sizes and passing between liquid and solid states at a fusion temperature and thereby moving said piston means along said working chamber;

heat exchanger means mounted on said side-wall member for alternately circulating a cool transfer fluid and a warm transfer fluid in close proximity to said working chamber to thereby respectively transfer heat from and to said fusible substance to alternately freeze and thaw said fusible substance;

means for alternately furnishing cool and warm transfer fluids to said heat exchanger means in synchronism with movement of said piston means;

wherein said fusible substance is crystalline in nature and wherein said means for alternately furnishing cool and warm transfer fluids is adjusted to switch between said cool and warm transfer fluids in such a manner that said fusion substance never completely thaws or freezes.

3. A power generation system as in claim 2 wherein said fusion material is calcium-chloride hexahydrate.

4. A power generation system comprising:

a cylinder defining a cylinder chamber therein;

a piston mounted in said cylinder chamber, said piston being movable in said cylinder, but being in sealed relationship with the side wall of said cylinder chamber;

a fusible substance inside said cylinder chamber on one side of said piston, said fusible substance having the characteristic of changing sizes when passing between liquid and solid states at a fusion temperature, said fusion temperature being above the temperature of a cool source and below the temperature of a warm source;

heat exchanger means mounted on said cylinder for alternately circulating a cool transfer liquid and a warm transfer liquid in close proximity to said cylinder to thereby respectively transfer heat from and to said fusible substance to alternately freeze and thaw said fusible substance, said cool transfer liquid being associated with said cool source to follow the temperature of said cool source and said warm transfer liquid being associated with said warm source to follow the temperature of said warm source;

coupling means for coupling said cool and warm sources to said heat exchanger means for transporting said cool and warm transfer liquids to and from said heat exchanger means;

linkage means coupled to said piston for transmitting kinetic energy therefrom to a working member; and a valve for controlling flow of said cool and warm transfer liquids from said cool and warm sources to said heat exchanger means;

wherein said valve is linked to said piston movement for controlling said valve in accordance with the amount of movement of said piston; and wherein said fusible substance is crystalline in nature and wherein said valve control means is adjusted to switch between said cool and warm transfer liquids in such a manner that said fusion substance never completely thaws or freezes.

5. A power generation system as in claim 4 wherein said cool source is an ambient cool water source of water that has been ground-cooled.

6. A power generation system as in claim 4 wherein said fusion temperature of said fusible substance is within the range of from 70° F. to 120° F.

7. A power generation system as in claim 6 wherein said fusion temperature is approximately 81° F.

8. A power generation system as in claim 4 wherein said heat exchanger means includes circulation through tubing in said cylinder chamber.

9. A power generation system as in claim 8 wherein said circulation tubing has fins extending therefrom.

10. A power generation system as in claim 9 wherein said fins are thin, but have main dimensions including straight lines which are parallel to the direction of piston travel.

11. A power generation system as in claim 4 wherein said fusion material is calcium-chloride hexahydrate.

12. A power system for converting warm and cool temperature sources having different temperatures into mechanical energy, said system comprising:

a power generation system comprising a cylinder defining a cylinder chamber therein, a piston mounted in said cylinder chamber, said piston being movable in said cylinder chamber but being sealed with the side wall of said cylinder chamber, a fusible substance inside said cylinder chamber on one side of said piston, said fusible substance having the characteristic of changing sizes when passing between solid and liquid states at a fusion temperature, said fusion temperature being above the temperature of a cool source and below the temperature of a warm source, heat exchanger means mounted on said cylinder for alternately circulating a cool transfer liquid and a warm transfer liquid in close proximity to said cylinder thereby respectively transfering heat from and to said fusible substance to alternately freeze and thaw said fusible substance, said cool transfer liquid being associated with said cool source to follow the temperature of water at said cool source and said warm transfer liquid being associated with said warm source to follow the temperature of said warm source, coupling means coupled to said cool source and said warm source for transporting cool transfer liquid and warm transfer liquid to and from said power generation system, and linkage means attached to said piston for transmitting piston movement;

said linkage means comprising hydraulic fluid in a hydraulic-fluid cylinder having a drive member therein linked to said piston;

an accumulator in communication with said hydraulic-fluid cylinder for receiving hydraulic fluid pressurized by said drive member, said accumulator comprising an elongated container having a movable member therein to define first and second chambers on opposite sides thereof, said movable member being movable toward one or the other end of said elongated container to change the respective volumes of said first and second chambers, said hydraulic fluid from said cylinder being in communication with said first chamber, said second chamber having an expandable energy storage means therein for contracting in response to said movable member moving to enlarge said first chamber, but thereafter applying pressure against said movable member to pressurize said hydraulic fluid in said first chamber; and a hydraulic utilization means coupled to said first chamber for converting said pressurized hydraulic fluid into mechanical energy;

wherein said accumulator includes a heat exchanger through which fluid is circulated for recapturing heat generated by said accumulator and said heat is transported to, and used by said warm source.

13. A power system as in claim 12 wherein said hydraulic utilization means is a piston engine having valves for alternately applying said hydraulic fluid to said piston, and exhausting said hydraulic fluid from said piston to thereby reciprocate said piston and drive an attached working member.

14. A power system as in claim 12 wherein said cool source is a source of water that has been ground cooled.

15. A power generation system as in claim 12 wherein said fusion temperature of said fusible substance is within the range of from 70° F. to 120° F.

16. A power generation system as in claim 15 wherein said fusion temperature is approximately 81° F.

17. A power generation system as in claim 12 wherein said heat exchanger means includes circulation through tubing in said cylinder chamber.

18. A power generation system as in claim 17 wherein said circulating tubing has fins extending therefrom, said fins extending in planes parallel with the direction of movement of said piston.

19. A power generation system as in claim 12 wherein is further included a valve for controlling flow of water from said ambient cool and warm sources to said heat exchanger means.

20. A power generation system as in claim 19 wherein said valve is linked to said piston movement for controlling said valve in accordance with the amount of movement of said piston.

21. A power generation system as in claim 20 wherein said fusible substance is crystalline in nature and wherein said valve control means is adjusted to switch between said cool and warm sources in such a manner that said fusion substance never completely thaws or freezes.

22. A power generation system as in claim 12 wherein said fusion material is calcium-chloride hexahydrate.

23. A power system as in claim 12 wherein said hydraulic utilization means includes a heat exchanger through which a fluid is circulated to recapture heat generated by said hydraulic utilization means, said fluid transporting said heat to said warm source for use thereby.

24. A power system as in claim 12 wherein said hydraulic utilization means is surrounded by a jacket through which a fluid is circulated to recapture heat generated by said hydraulic utilization means, said fluid tarnsporting said heat to said warm source for use thereby.

25. A power system as in claim 12 wherein said hydraulic fluid is in a closed system including said clyinder, said accumulator, said hydraulic utilization means, and a separate reservoir.

* * * * *